(12) United States Patent
Watzlawski et al.

(10) Patent No.: US 11,710,597 B2
(45) Date of Patent: Jul. 25, 2023

(54) METHOD FOR THE PRODUCTION OF AN INDUCTIVE CHARGING DEVICE

(71) Applicant: Mahle International GmbH, Stuttgart (DE)

(72) Inventors: Markus Watzlawski, Esslingen (DE); Volker Schall, Hemmingen (DE)

(73) Assignee: Mahle International GmbH

( * ) Notice: Subject to any disclaimer, the term of this patent is extended or adjusted under 35 U.S.C. 154(b) by 418 days.

(21) Appl. No.: 16/911,390

(22) Filed: Jun. 24, 2020

(65) Prior Publication Data

US 2020/0411235 A1 Dec. 31, 2020

(30) Foreign Application Priority Data

Jun. 25, 2019 (DE) ...................... 10 2019 209 141.5

(51) Int. Cl.
| | |
|---|---|
| *H01F 41/02* | (2006.01) |
| *H01F 41/07* | (2016.01) |
| *H01F 27/32* | (2006.01) |
| *H02J 50/10* | (2016.01) |

(52) U.S. Cl.
CPC ....... *H01F 41/0246* (2013.01); *H01F 27/327* (2013.01); *H01F 41/07* (2016.01); *H02J 50/10* (2016.02)

(58) Field of Classification Search
CPC .... H01F 41/0246; H01F 41/07; H01F 27/327; H02J 50/10
See application file for complete search history.

(56) References Cited

U.S. PATENT DOCUMENTS

| | | | | |
|---|---|---|---|---|
| 4,149,135 | A * | 4/1979 | Roespel ................. | H01F 41/02 336/83 |
| 4,706,058 | A * | 11/1987 | Barbier ................. | H01F 27/027 29/606 |
| 6,049,191 | A | 4/2000 | Terazoe et al. | |
| 6,377,152 | B1 * | 4/2002 | Shikama ................. | H01F 17/04 336/200 |
| 7,109,868 | B2 * | 9/2006 | Yoakum ........... | G06K 19/07749 340/572.5 |
| 8,943,675 | B2 * | 2/2015 | Fan ..................... | H01F 41/0246 29/606 |
| 9,515,515 | B2 | 12/2016 | Kim | |
| 10,118,497 | B2 * | 11/2018 | Garcia .................... | H01F 38/14 |
| 10,254,499 | B1 * | 4/2019 | Cohen ..................... | B23K 1/20 |

(Continued)

FOREIGN PATENT DOCUMENTS

| | | | | |
|---|---|---|---|---|
| CN | 102612720 A | * | 7/2012 | ......... H01F 1/15358 |
| CN | 102822918 A | * | 12/2012 | ............. H01F 27/24 |

(Continued)

OTHER PUBLICATIONS

Chinese Office Action dated May 27, 2022 related to corresponding Chinese Patent Application No. 202010549203.1.

(Continued)

*Primary Examiner* — Jeffrey T Carley
(74) *Attorney, Agent, or Firm* — Fishman Stewart PLLC

(57) ABSTRACT

A method for producing an inductive charging device may include inserting a ferrite and a coil, wound from a braid, into a mould; and encasing the ferrite and the braid at least partially with a plastic in a low pressure casting method, a pressing transfer moulding method, or an injection moulding method.

20 Claims, 2 Drawing Sheets

(56) References Cited

U.S. PATENT DOCUMENTS

| | | | | |
|---|---|---|---|---|
| 10,692,651 | B2 * | 6/2020 | Keil | ............................ H01F 3/08 |
| 2015/0008752 | A1 * | 1/2015 | Boys | ........................ B60L 53/63 |
| | | | | 307/104 |
| 2015/0222018 | A1 * | 8/2015 | Kumura | .................. H02J 50/20 |
| | | | | 307/104 |
| 2018/0005747 | A1 | 1/2018 | Shijo | |
| 2021/0384754 | A1 * | 12/2021 | Xu | ...................... G06F 3/03545 |

FOREIGN PATENT DOCUMENTS

| | | | | |
|---|---|---|---|---|
| CN | 103025563 A | * | 4/2013 | ............ B60L 11/182 |
| CN | 103891098 A | | 6/2014 | |
| CN | 106715187 A | | 5/2017 | |
| DE | 89 09 783 U1 | | 9/1990 | |
| DE | 600 36 294 T2 | | 12/2007 | |
| EA | 2 667 390 A1 | | 11/2013 | |
| EP | 1052595 A1 | * | 11/2000 | ......... B29C 45/1635 |
| EP | 2775486 A2 | * | 9/2014 | ........... H01F 27/022 |
| EP | 2 858 079 A1 | | 4/2015 | |
| JP | 2008-87 733 A | | 4/2008 | |
| JP | 2015076427 A | | 4/2015 | |
| WO | WO-2017094367 A1 | * | 6/2017 | ............. H01F 27/24 |
| WO | WO-2017/147 549 | | 8/2017 | |
| WO | WO-2018065435 A1 | * | 4/2018 | ............... B60K 1/04 |

OTHER PUBLICATIONS

Chinese Office Action dated Nov. 3, 2021 related to corresponding Chinese Patent Application No. 202010549203.1.

English abstract for JP-2008-87 733.

* cited by examiner

METHOD FOR THE PRODUCTION OF AN INDUCTIVE CHARGING DEVICE

CROSS-REFERENCE TO RELATED APPLICATIONS

This application claims priority to German Patent Application No. DE 10 2019 209 141.5, filed on Jun. 25, 2019, the contents of which is hereby incorporated by reference in its entirety.

TECHNICAL FIELD

The present invention relates to a method for the production of an inductive charging device. The invention relates, furthermore, to an inductive charging device which is produced according to this method.

BACKGROUND

Inductive charging devices are becoming increasingly widespread for example also in the wireless charging of smartphones or other electrical equipment. Essentially such inductive charging devices consist of an electrically energizable coil and a ferrite, wherein with an energizing of the coil a magnetic field arises, via which energy is able to be transferred. The ferrite and the coil are usually cast into a casting compound of plastic, in order to be able to keep the two components both at a predefined distance from one another and at the same time to be able to arrange them in the plastic in a protected manner. Such a casting usually takes place in a corresponding housing having a cavity, wherein the casting compounds which are used require a comparatively long hardening time of up to 24 hours, whereby a long cycle time is provided, because the inductive charging unit must be stored intermediately up to complete load-bearing capacity of the casting compound. In addition, the housing in which the braids or respectively the coil and the ferrite are inserted and cast, must be pre-treated with adhesion promoters or plasma methods, in order to be able to ensure an optimum adhesion of the casting compound. The housing is necessary here as lost formwork for the casting compound and increases the variety of parts. Furthermore, known casting compounds emit solvents during processing, which in turn require particular occupational safety measures, such as for example a suction. Also a bubble-free casting is difficult. Furthermore, such casting installations are expensive and maintenance-intensive. This lies in particular also in the housing which is to be provided separately for each inductive charging device. A further disadvantage of such a casting is that the comparatively soft ferrite with a hardness of only approximately 60 HV can tear during the mounting or the subsequent operation of the inductive charging device and thereby can lead to a reduction of the charging capacity which is able to be transferred.

SUMMARY

The present invention is therefore concerned with the problem of indicating an improved method for the production of an inductive charging device, which in particular overcomes at least some of the disadvantages known from the prior art.

This problem is solved according to the invention by the subject matter of the independent claim(s). Advantageous embodiments are the subject matter of the dependent claim(s).

The present invention is based on the general idea of arranging a ferrite and a coil of an inductive charging device no longer, as hitherto, firstly in a housing and encasing them there with a casting compound which only hardens slowly, but rather of encasing at least partially with plastic the ferrite and the coil, wound from a braid, in a low pressure casting method or in a pressing transfer moulding method or in an injection moulding method, and thereby being able to achieve a comparatively quick cycle time and low production costs connected therewith. Through the method according to the invention, for example through the low pressure casting method, pressing transfer moulding, or the injection moulding method, a cycle time of only approximately 2 min results, which signifies only a very small fraction of the cycle time of up to 24 hours in a casting which was necessary hitherto. Furthermore, a reduction of the variety of parts can also be achieved, because the housing, necessary hitherto as lost formwork for the casting compound, can be dispensed with entirely. In the low pressure casting method, in the injection moulding method or in the pressing transfer moulding method, furthermore a bubble-free production is also possible, whereby the quality of the produced inductive charging device can be distinctly increased. As a whole, the investment costs or respectively tool costs can also be distinctly reduced compared to conventional casting installations, which lies particularly in that suction installations, which were necessary hitherto, to produce occupational safety in the use of casting compounds which contain solvent, can be dispensed with, because in the low pressure casting method according to the invention or respectively pressing transfer moulding method plastics can be used which are solvent-free.

In the method according to the invention, the braids, wound for example to form a coil, and the ferrite are inserted into a mould and are subsequently at least partially encased or respectively cast with the plastic, for example with a thermally conductive duromer or silicone. The great advantage of the low pressure casting method lies in particular also in that, compared for example to a conventional plastic injection moulding, the use of low viscosity adhesives is possible, which can be applied very gently at low pressure and low temperature without, in so doing, damaging in certain circumstances sensitive substrates such as for example the braid or the ferrite. In the low pressure casting method, not only can solvent-free plastics be used for the plastic, but also hot melt adhesive made of natural and renewable raw materials, whereby a considerable ecological advantage can be achieved. A further great advantage of such a low pressure casting method is that the cycle times are distinctly less, wherein the produced inductive charging device in addition is fully usable directly after removal from the mould. Through the gentle embedding of the components in the low pressure casting method, pressing transfer moulding method or injection moulding method, in addition an optimum protection of these components by the plastic casing can be achieved.

In pressing transfer moulding usually duroplasts and elastomers are used, wherein these plastics are firstly heated and subsequently pressed into a mould, in which the braid and the ferrite are situated, and wherein they harden under heat and pressure. Here, various piston methods are used, namely the lower piston method, the upper piston method and horizontally arranged automatic injection machines. Generally, in the pressing transfer moulding method firstly a pre-plasticized and metered plastic moulding compound is heated in the pre-chamber, and after insertion of the braid and of the ferrite into the mould or respectively the tool, the latter is closed. Subsequently, the heated moulding compound is injected or respectively pressed into the mould or respectively the tool, and is left therein during a so-called dwell time, wherein during the dwell time a reacting or vulcanizing, in particular a hardening, of the plastic occurs. After the tool is opened, the plastic which has previously been filled is already hardened solid and can be used further directly.

The plastic injection moulding method also offers advantages, because also with this a comparatively quick cycle time can be achieved, and in addition the hitherto necessary housing into which the casting compound was filled, can be omitted.

In an advantageous further development of the method according to the invention, the ferrite and the braid is encased with plastic in the low pressure casting method or in the injection moulding method for duromers and namely with a pressure p of $5\ bar \leq p \leq 100$ bar, preferably with a pressure p of $5\ bar \leq p \leq 40$ bar. Through this comparatively low pressure, on the one hand a complete and bubble-free filling of the mould or respectively of the cavity in the casting tool is possible, on the other hand, owing to the low pressure there is to be no fear of damage to the components, i.e. the braid and the ferrite.

Expediently, the ferrite and the braid are encased with plastic in the low pressure casting method or in the injection moulding method for thermosetting plastics at a temperature T of max. 200° C. This comparatively low temperature likewise enables a gentle encasing of the braid and of the ferrite with plastic. Furthermore, the above-mentioned methods offer advantages with regard to:

reduction of the cycle time compared to conventional casting, simplification of the process, because no suction is necessary, as in conventional casting, simple process, because it takes place in a tool, the process can be monitored and documented by means of the process parameters of the injection moulding/pressing transfer moulding machine.

In an advantageous further development of the solution according to the invention, a duromer, a silicone, an elastomer, a formaldehyde resin, in particular a phenoplast or a melamine resin, or a reaction resin, in particular an epoxy resin or an unsaturated polyester resin, is used as plastic. Duromers are hard, glass-like polymer materials, which are firmly crosslinked three-dimensionally via chemical primary valence bonds. These are distinguished by a high stability, rigidity and toughness and have, furthermore, a good chemical resistance and a very good workability, in particular for plastic injection moulding, such as for example the pressing transfer moulding method or the low pressure casting method. Duromers, similarly to silicones, have very good electrical insulation characteristics and adjustable thermal conductivities and are suitable, furthermore, also for injection moulding. Phenoplast, as a possible example for a duromer, is hard and very break-resistant and can also be used in the injection moulding method. Reaction resins, such as epoxy resin for example, can also be advantageously processed by the named methods, wherein of course further additives, such as for example particles (e.g. boron nitrite to increase the thermal conductivity), can be admixed to the plastics, in order to additionally produce specially desired characteristics.

In an advantageous further development of the method according to the invention, a carrier is inserted into the mould, on which carrier the ferrite and/or the braid is/are able to be fixed. Such a carrier can be formed for example from plastic, in particular from a duromer or phenol resin, and in particular can have corresponding mountings for the braid, so that the latter, in particular in a coil shape, can already be held on the carrier. Through such a carrier, in particular a predefined position of the braid and/or of the ferrite can be guaranteed in the casting tool during the encasing with plastic.

In an advantageous further development of the solution according to the invention, during the encasing of the ferrite and of the braid with plastic, channel structures are produced for fluid channels, in particular cooling channels. This can be achieved for example by special negative contours in the cavity or respectively in an inner wall of the casting tool, whereby the production of such cooling channel structures or respectively fluid channels, in particular cooling channels, is simplified.

Expediently, a plastic- or aluminium plate is glued to the hardened plastic of the inductive charging device or such a plastic- or aluminium plate is inserted into the mould and is connected with the plastic during the at least partial encasing of the ferrite or of the braid. Such a plastic- or aluminium plate serves for the later production of the fluid channels, in particular cooling channels, and for the cooling of the inductive charging device.

A further plastic- or aluminium plate can also be provided, wherein the two plastic- or aluminium plates have internal fluid channels, in particular cooling channels, and a fluid inlet, in particular coolant inlet, and a fluid outlet, in particular coolant outlet. Alternatively, it is also conceivable that the plastic- or aluminium plate is configured so as to be flat and forms fluid channels, in particular cooling channels together with the plastic of the inductive charging device, wherein in this case the channel structures for the fluid channels, in particular cooling channels, were produced during the encasing of the ferrite and of the braid with plastic. The last mentioned embodiment offers here the great advantage that not as hitherto two plastic- or aluminium plates are necessary for the production of the fluid channels, in particular cooling channels, but rather only one, in addition flat and therefore favourably priced, plastic- or aluminium plate is sufficient and together with the hardened plastic of the inductive charging device form the channel structure for the fluid channels, in particular cooling channels.

The present invention is further based on the general idea of indicating an inductive charging device produced according to the previously described method, which can be produced for the first time without a housing which is to be produced separately and is to be used as lost formwork, and can therefore be produced at a favourable cost. In addition, such an inductive charging device can also be produced distinctly more simply with regard to occupational safety, because in particular suction devices, necessary hitherto, or other occupational safety measures due to the use of plastics which contain solvents, can be omitted.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
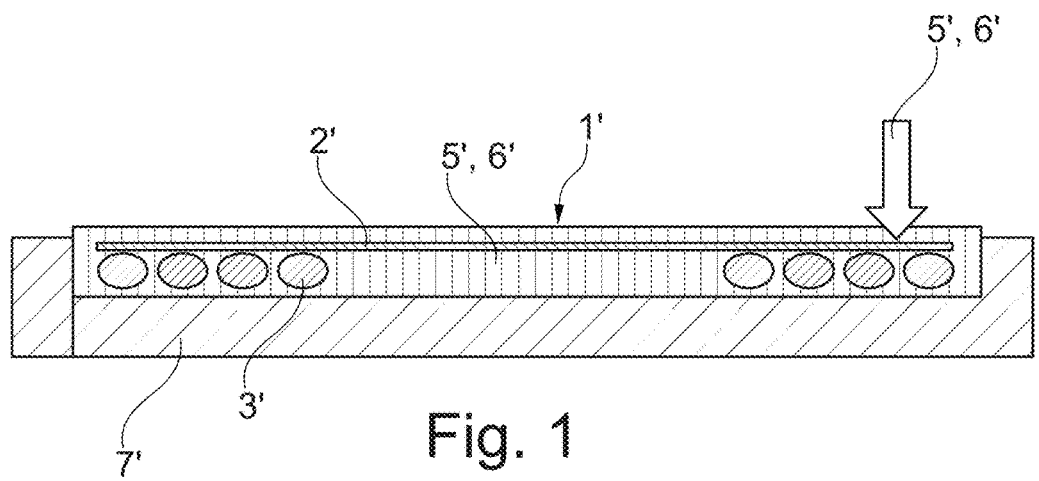
FIG. 1 shows a sectional illustration through an inductive charging device produced according to the prior art.

According to FIGS. 2 to 4, an inductive charging device 1, produced according to a method in accordance with the invention, is shown in a sectional illustration, wherein the inductive charging device 1 is produced as follows:

Firstly, a ferrite 2 and a braid 3, which for example is wound in the form of a coil (cf. FIGS. 5 and 6), is inserted into a mould 4, similar to a plastic injection moulding tool. Subsequently, the ferrite 2 and the braid 3, which can also of course be several braids 3, are encased at least partially with plastic 5 in the low pressure casting method or in the pressing transfer moulding method or in the injection moulding method. Hereby, in particular a cycle time and, furthermore, also the production costs for the inductive charging device 1 can be distinctly reduced, just as for example occupational safety measures which are to be taken, such as suction devices for example, which were necessary in the conventional production of the inductive charging device 1' (cf. FIG. 1) owing to the casting compounds 6' containing solvent.

The inductive charging device 1 according to the invention can be formed in particular so that it is suitable for the charging of electrically operated vehicles. The induction charging device 1 according to the invention can be arranged here in an electrically operated vehicle, wherein it is advantageous if the induction charging device 1 is arranged as close as possible to the travelling ground on which the vehicle moves. Hereby, the proportion of vehicle components which are penetrated by the chronologically varying magnetic field is minimized, whereby for example energy losses in the form of eddy currents are prevented.

According to FIG. 1, an inductive charging device 1' in accordance with the prior art is shown here in a sectional illustration, wherein all the reference numbers were used in an analogous manner to FIGS. 2 to 6, but were given an apostrophe. For the production of the inductive charging device 1' firstly the ferrite 2' and the braid 3' are inserted into a housing 7' and this housing 7' is subsequently filled with the plastic 5' or respectively the casting compound 6' and via this the braid 3' or respectively the ferrite 2' is embedded into the plastic 5'. A disadvantage in this method, however, is that until further use a complete hardening of the plastic 5' or respectively of the casting compound 6' is to be awaited, which can last up to 24 hours. In addition, a housing 7', to be produced separately and serving as lost formwork, is necessary, which can be dispensed with in the method according to the invention in accordance with FIGS. 2 to 4. As the casting compound 6' usually also contains solvent, in addition special occupational safety measures such as suction devices, for example, must be provided. Also, a bubble-free casting is difficult in certain circumstances. In order to achieve a reliable anchoring of the casting compound 6' in the housing 7', in addition the housing 7' must be pre-treated with an adhesion promoter or respectively a plasma method, which is also laborious and expensive. This can all be dispensed with in the method according to the invention.

In accordance with the method according to the invention, the ferrite 2 and the braid 3 are encased with plastic 5 in the low pressure casting method, pressing transfer moulding method or injection moulding method with a pressure p of 5 bar≤p≤100 bar, preferably with only a pressure p of 5 bar≤p≤40 bar. Hereby, a gentle encasing of the ferrite 2 and of the braid 3 can be achieved, and a damage to these components can be reliably avoided. Furthermore, the ferrite 2 and the braid 3 are preferably encased with plastic 5 at a maximum temperature T of 200° C., whereby likewise a gentle embedding is possible.

A duromer, a silicone, an elastomer, a formaldehyde resin, for example a phenoplast or a melamine resin, or a reaction resin, for example an epoxy resin or an unsaturated polyester resin, can be used for example as plastic 5. This non exhaustive list already gives an indication of what a varied use of plastics 5 is possible for the method according to the invention.

For better fixing of the ferrite 3 and of the braid 2 in the mould 4, a carrier 8 (cf. FIGS. 5 and 6) can be used, for example, which is inserted into the mould 4 and on which the ferrite 2 and/or the braid 3 are able to be fixed. The braid 3 is, for example, wound in a spiral-shaped manner according to the right-hand illustration in FIG. 6 and is held via corresponding clip connections 9 on the carrier 8. The windings are substantially square here, but with greatly rounded corners. The ferrite 2 is also arranged on the carrier 8, so that it can also be held via the carrier 8. The left-hand illustration in FIG. 6 shows here the carrier 8 without braid 3 or respectively ferrite 2.

Figure 2:
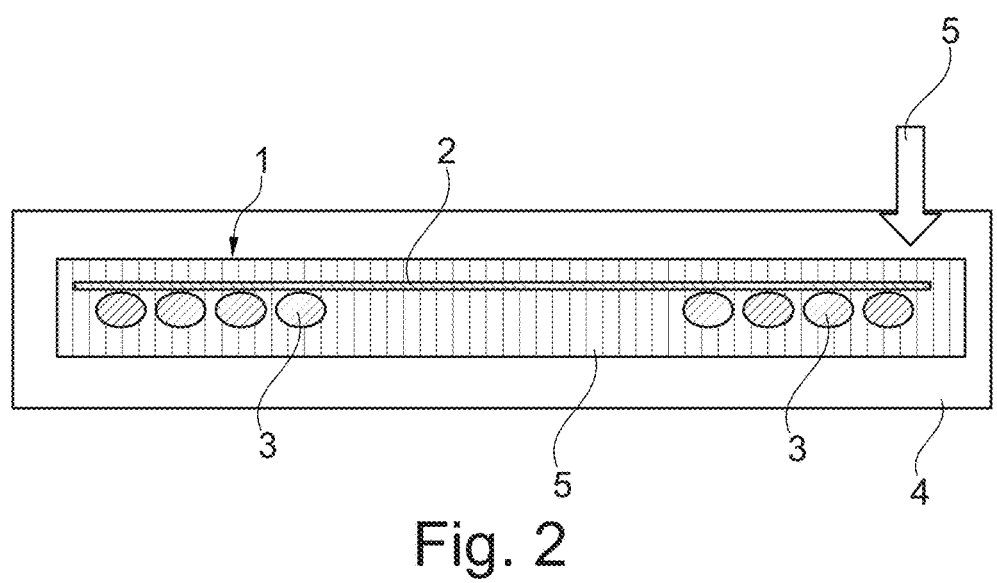
FIG. 2 shows a sectional illustration through a mould in the production of an inductive charging device according to the invention.
Figure 3:
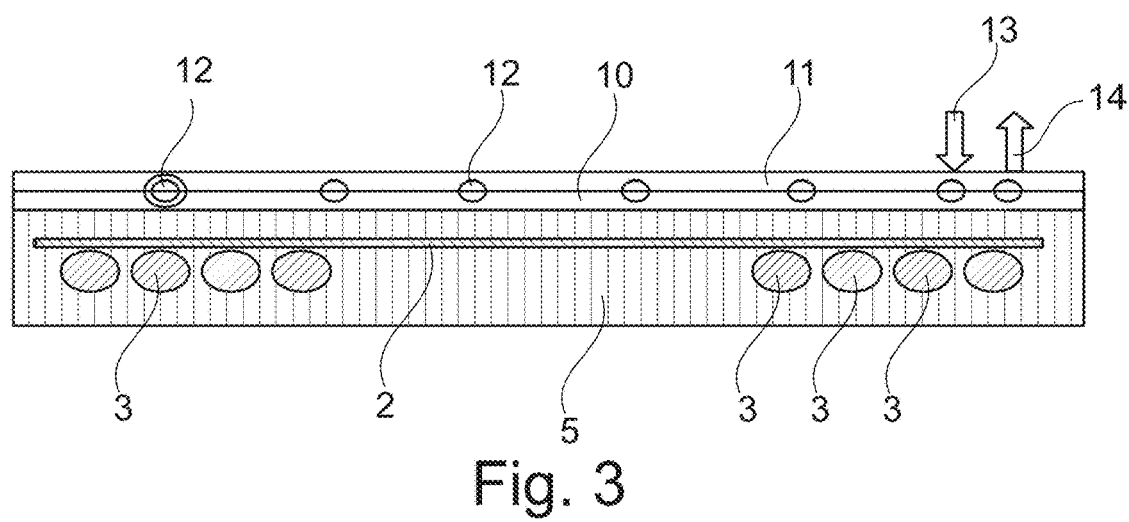
FIG. 3 shows an inductive charging device produced according to FIG. 2, with two plastic- or aluminium plates.

Observing the embodiment of the inductive charging device 1 in accordance with the invention according to FIG. 3, it can be seen that there a plastic- or aluminium plate 10 has been glued with the hardened plastic 5 of the inductive charging device 1, or such a plastic- or aluminium plate 10 was firstly inserted into the mould 4 according to FIG. 2 and was connected there with the plastic 5 during the at least partial encasing of the ferrite 2 and/or of the braid 3. In FIG. 3, a further plastic- or aluminium plate 11 is also provided, which together with the plastic- or aluminium plate 10, connected with the plastic 5, delimits internal fluid channels, in particular cooling channels 12 and has a fluid inlet, in particular coolant inlet 13 and a fluid outlet, in particular coolant outlet 14.

Figure 4:
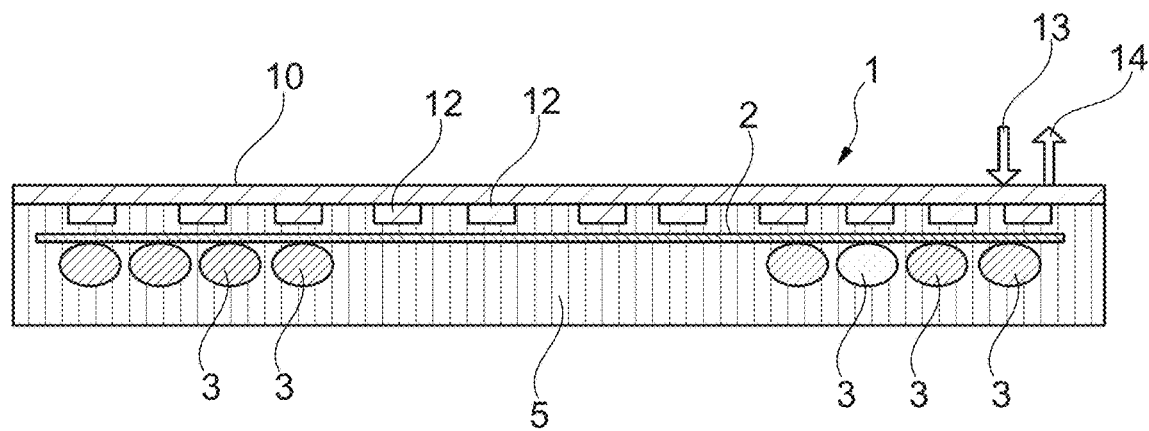
FIG. 4 shows an illustration as in FIG. 2, but with a single plastic- or aluminium plate.

Alternatively to FIG. 3, according to FIG. 4 an embodiment is produced, in which during the encasing of the ferrite 2 and of the braid 3 with plastic 5, channel structures are produced for fluid channels, in particular cooling channels 12, by the mould 4 having corresponding projections. In this case, only a single flat plastic- or aluminium plate 10 has to be connected with the plastic 5 of the inductive charging device 1, in order to produce the fluid channels, in particular cooling channels 12. Hereby, a particularly preferred embodiment is created, in which only a single plastic- or aluminium plate 10 is necessary.

Figure 5:
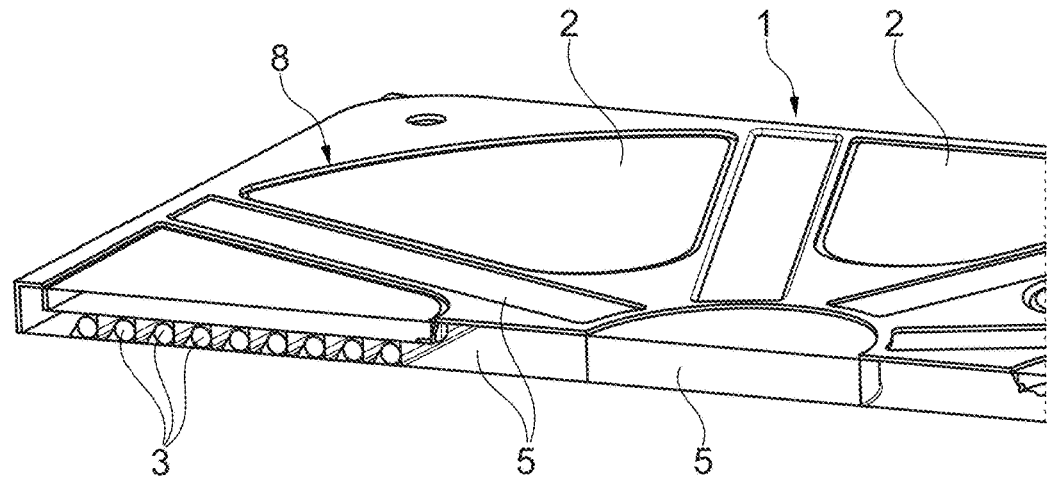
FIG. 5 shows a sectional illustration through a carrier according to the invention, on which a braid is fixed.
Figure 6:
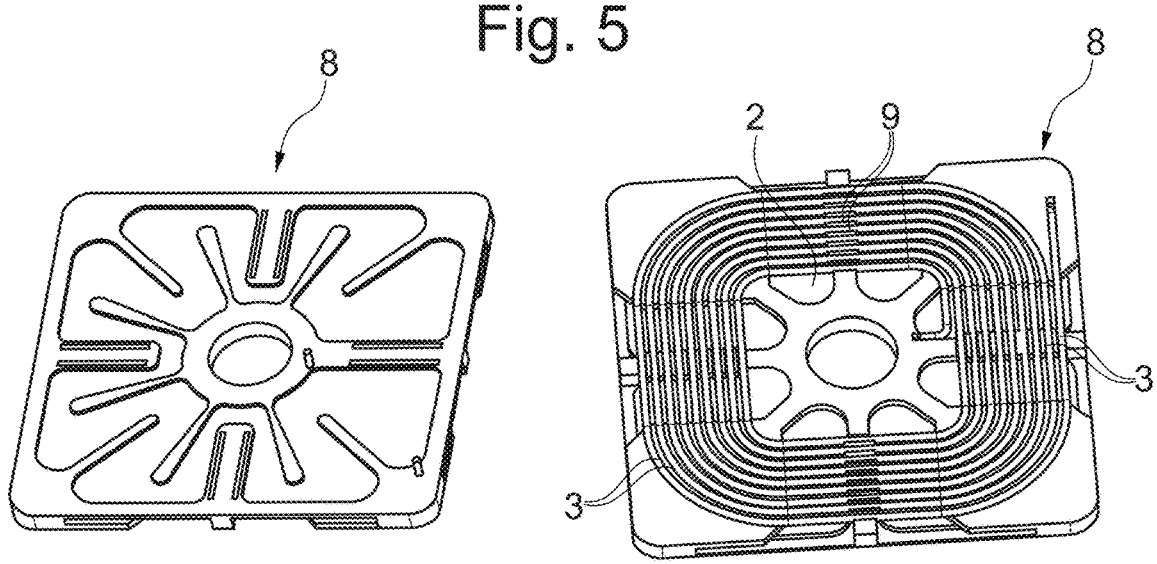
FIG. 6 shows a front and rear view of such a carrier.

Still observing FIG. 5, a carrier 8 can also be seen herein, on which a ferrite 2 and a braid 3 are arranged. The intermediate spaces are cast here with plastic 5. Such an inductive charging device 1 would be to be provided for equipping with fluid channels, in particular cooling channels, 12 with two plastic- or aluminium plates 10, 11. Via the fluid channels, cooling channels, 12, the inductive charging device 1 can be cooled.

With the inductive charging device 1 according to the invention, not only can the production costs be distinctly reduced, likewise the cycle times for the production thereof, but also occupational safety measures which are to be taken if applicable, because in particular only solvent-free plastics 5 are used. Furthermore, the housing 7' which was necessary in the prior art can also be dispensed with, likewise a pre-treatment thereof, in order to guarantee a necessary adhesion between the plastic 5' or respectively the casting compound 6' and the housing 7'.

The invention claimed is:

1. A method for the production of an inductive charging device, comprising:
   inserting a ferrite and a coil, wound from a braid, into a mould;
   inserting a carrier into the mould, on which the ferrite and the braid is arranged, wherein the carrier has clip connections for holding the braid in a coil shape; and
   at least partially encasing the ferrite and the braid with a plastic in a low pressure casting method, a pressing transfer moulding method, or an injection moulding method.

2. The method according to claim 1, wherein the ferrite and the braid are encased with the plastic with a pressure ranging from 5 bar to 100 bar.

3. The method according to claim 1, wherein the ferrite and the braid are encased with the plastic at a temperature of a maximum of 200° C.

4. The method according to claim 1, wherein the plastic includes one of a duromer, a silicone, an elastomer, a formaldehyde resin, or a reaction resin.

5. The method according to claim 1, wherein the carrier has openings for receiving the plastic during the at least partially encasing the ferrite and the braid with the plastic.

6. The method according to claim 1, wherein fluid channels are produced during the at least partial encasing of the ferrite and of the braid with plastic.

7. The method according to claim 1, wherein one of:
   a plastic plate or an aluminium plate is glued to the plastic once hardened; and
   a plastic plate or an aluminium plate is inserted into the mould and is connected with the plastic during the at least partial encasing of the ferrite and the braid.

8. The method according to claim 7, wherein a further plastic plate or a further aluminium plates is provided, wherein the plastic plate or the aluminium plate together with the further plastic plate or the further aluminium plate delimit internal fluid channels and a fluid inlet and a fluid outlet.

9. The method according to claim 7, wherein the plastic plate or the aluminium plate is flat and forms fluid channels together with the plastic of the inductive charging device.

10. An inductive charging device produced according to a method comprising:
    inserting a ferrite and a coil, wound from a braid, into a mould;
    inserting a carrier into the mould, on which the ferrite and the braid is arranged, wherein the carrier has clip connections for holding the braid in a coil shape; and
    at least partially encasing the ferrite and the braid with a plastic in a low pressure casting method, a pressing transfer moulding method, or an injection moulding method.

11. The inductive charging device according to claim 10, further comprising a plastic plate or an aluminium plate connected with the plastic.

12. The inductive charging device according to claim 11, further comprising a further plastic plate or a further aluminium plate, wherein the further plastic plate or the further aluminium plate together with the plastic plate or the aluminium plate delimit internal fluid channels and a fluid inlet and a fluid outlet.

13. The inductive charging device according to claim 10, wherein the plastic includes one of a duromer, a silicone, an elastomer, a formaldehyde resin, or a reaction resin.

14. The inductive charging device according to claim 10, wherein the carrier has openings for the plastic.

15. The inductive charging device according to claim 10, wherein fluid channels are are provided at least partially by the plastic.

16. The method according to claim 2, wherein the pressure ranges from 5 bar to 40 bar.

17. The method according to claim 4, wherein the plastic includes the formaldehyde resin, and the formaldehyde resin is a phenoplast or a melamine resin.

18. The method according to claim 4, wherein the plastic includes the reaction resin, and the reaction resin is an epoxy resin or an unsaturated polyester resin.

19. The method according to claim 6, wherein the fluid channels are produced by corresponding projections of the mould forming channel structures in the plastic.

20. The method according to claim 8, wherein the fluid channels are cooling channels, the fluid inlet is a coolant inlet, and the fluid outlet is a coolant outlet.

* * * * *